United States Patent
Prokoph et al.

(10) Patent No.: US 11,675,787 B2
(45) Date of Patent: Jun. 13, 2023

(54) MULTIPLE SEARCH COLLECTIONS BASED ON RELEVANCY VALUE

(71) Applicant: International Business Machines Corporation, Armonk, NY (US)

(72) Inventors: Andreas Prokoph, Boeblingen (DE); Uwe Hansmann, Tuebingen (DE); Timo Kussmaul, Boeblingen (DE); Thomas Steinheber, Maihingen (DE); Kai Brennenstuhl, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 16/354,458

(22) Filed: Mar. 15, 2019

(65) Prior Publication Data
US 2020/0293531 A1 Sep. 17, 2020

(51) Int. Cl.
*G06F 16/2453* (2019.01)
*G06F 16/2457* (2019.01)
*G06F 16/22* (2019.01)

(52) U.S. Cl.
CPC .... *G06F 16/24539* (2019.01); *G06F 16/2272* (2019.01); *G06F 16/24578* (2019.01)

(58) Field of Classification Search
CPC .. G06F 16/2282; G06F 16/248; G06F 3/0656; G06F 16/24539; G06F 16/2272; G06F 16/24578
See application file for complete search history.

(56) References Cited

U.S. PATENT DOCUMENTS

| | | | |
|---|---|---|---|
| 8,756,220 B1 | 6/2014 | Provine | |
| 9,262,489 B2 | 2/2016 | Tanner | |
| 10,263,908 B1* | 4/2019 | Ganjoo | H04L 47/76 |
| 2008/0005090 A1* | 1/2008 | Khan | G06F 16/951 |
| 2011/0307462 A1* | 12/2011 | Holsman | G06F 16/3349 |
| | | | 707/706 |
| 2015/0032717 A1* | 1/2015 | Cramer | G06F 16/24575 |
| | | | 707/709 |
| 2016/0162502 A1* | 6/2016 | Zhou | G06F 40/205 |
| | | | 707/722 |
| 2016/0188618 A1* | 6/2016 | Panchapakesan | H04L 67/125 |
| | | | 707/741 |
| 2017/0006135 A1* | 1/2017 | Siebel | H04L 67/53 |
| 2017/0032251 A1* | 2/2017 | Podgorny | G06Q 30/016 |
| 2017/0357725 A1 | 12/2017 | Hornkvist | |

(Continued)

*Primary Examiner* — Mariela Reyes
*Assistant Examiner* — Courtney Harmon
(74) *Attorney, Agent, or Firm* — Richard B. Thomas

(57) ABSTRACT

A computer-implemented method for optimizing a search index of a search service may be provided. The method may comprise storing continuously search queries of the search service, receiving a content item to be indexed, adding the content item temporarily to the a main index of the search service, determining a set of document relevancy factor (DRF) values for the content item for a selected set of stored search queries, determining a combined document relevancy factor value out of the determined set of document relevancy factor values for the content item, comparing the combined document relevancy factor value for the content item to a document relevancy factor threshold value, and adding, in response to the comparing, the content item permanently to an index based on the results of the comparing.

20 Claims, 9 Drawing Sheets

(56) References Cited

U.S. PATENT DOCUMENTS

| | | | |
|---|---|---|---|
| 2018/0089324 A1* | 3/2018 | Pal | G06F 9/5011 |
| 2018/0365309 A1* | 12/2018 | Oliner | H04L 41/0681 |
| 2019/0095478 A1* | 3/2019 | Tankersley | G06F 16/2379 |
| 2019/0272296 A1* | 9/2019 | Prakash | G06F 16/90335 |
| 2020/0159765 A1* | 5/2020 | Manin | G06F 16/24578 |

* cited by examiner

500

| 502 | Search service receives request to index content item |

| 504 | Search service sends content item to DRF Calculator |

| 506 | DRF Calculator determines document DRF |

| 508 | DRF Calculator returns DRF to search service |

| 510 | Search service determines appropriate index based on DRF |

| 512 | Search service places content item in previously determined index for that tenant |

| 702 | Load query and execute against main index |

| 704 | Execute boost and bury result against result list |

| 706 | Determine position of CI in document relevancy window |

| 708 | Assign DRF to a CI for a current query |

| 710 | Boosted and highly ranked CIs get a high DRF |

FIG. 7

MULTIPLE SEARCH COLLECTIONS BASED ON RELEVANCY VALUE

BACKGROUND

This disclosure relates generally to an index generation for a search engine, and more specifically, to a computer-implemented method for optimizing a search index of a search service. This disclosure relates further to a search related system for optimizing a search index of a search service, and a computer program product.

Managing large amounts of data can be a significant challenge for individuals as well as for enterprise IT (information technology) management. Often, cloud solutions—either on premise or as a remote cloud computing solution—are used to search for a specific expression in large amounts of content in the form of documents. Thus, cloud services require a search service well equipped to find and retrieve information resources for further use. Such services may typically support multiple tenants, with each tenant representing individual users (or groups of users), by separating and/or organizing information in a tenant specific way.

For a search service, this typically includes maintaining one or more search collections per tenant, which may put a lot of load on the search service; i.e., thousands of search collections may need to be updated and searched through.

In order to deliver satisfactory services, a search service needs to be able to return a list of documents comprising the term a user is looking for in a short response time. Users typically do not accept significant delays for search requests and expect nearly perfect results from the search service including a proper scoring or ranking of the documents listed as a search result. Such proper results depend heavily on the content and configuration of a search index, used by, e.g., a tenant. However, in some cases, the index for specific tenant is eventually not ideal, e.g., because the organization of terms in the index is performed according to a non-optimized fashion. Hence, there may be a need for optimizing the indexing process.

SUMMARY

According to one aspect of the present disclosure, a computer-implemented method for improving a search service is provided. The method may comprise storing continuously search queries of the search service, receiving a content item to be indexed, adding the content item temporarily to a main index of the search service, determining a set of document relevancy factor (DRF) values for the content item for a selected set of stored search queries, determining a combined document relevancy factor value out of the determined set of document relevancy factor values for the content item, comparing the combined document relevancy factor value for the content item to a document relevancy factor threshold value, and adding, in response to the comparing, the content item to an index based on the results of the comparing.

According to another aspect of the present disclosure, a related search system for improving a search service is provided. The system may comprise one or more processors and a memory communicatively coupled to the one or more processors, wherein the memory comprises instructions which, when executed by the one or more processors, cause the one or more processors to perform a method. The method may comprise storing continuously search queries of the search service, receiving a content item to be indexed, adding the content item temporarily to a main index of the search service, determining a set of document relevancy factor (DRF) values for the content item for a selected set of stored search queries, determining a combined document relevancy factor value out of the determined set of document relevancy factor values for the content item, comparing the combined document relevancy factor value for the content item to a document relevancy factor threshold value, and adding, in response to the comparing, the content item to an index based on the results of the comparing.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

It should be noted that embodiments of the invention are described with reference to different subject matter. In particular, some embodiments are described with reference to method type claims, whereas other embodiments are described with reference to apparatus type claims. However, a person of skill in the art will gather from the above and the following description that, unless otherwise specified, in addition to any combination of features belonging to one type of subject matter, also any combination between features relating to different subject matter, in particular, between features of the method type claims, and features of the apparatus type claims, is considered to be disclosed within this document.

FIG. 5 shows a flowchart of steps during the indexing phase, in accordance with embodiments of the present disclosure.

FIG. 7 shows a flowchart DRF Calculator sub-flow, in accordance with embodiments of the present disclosure.

Figure 1:
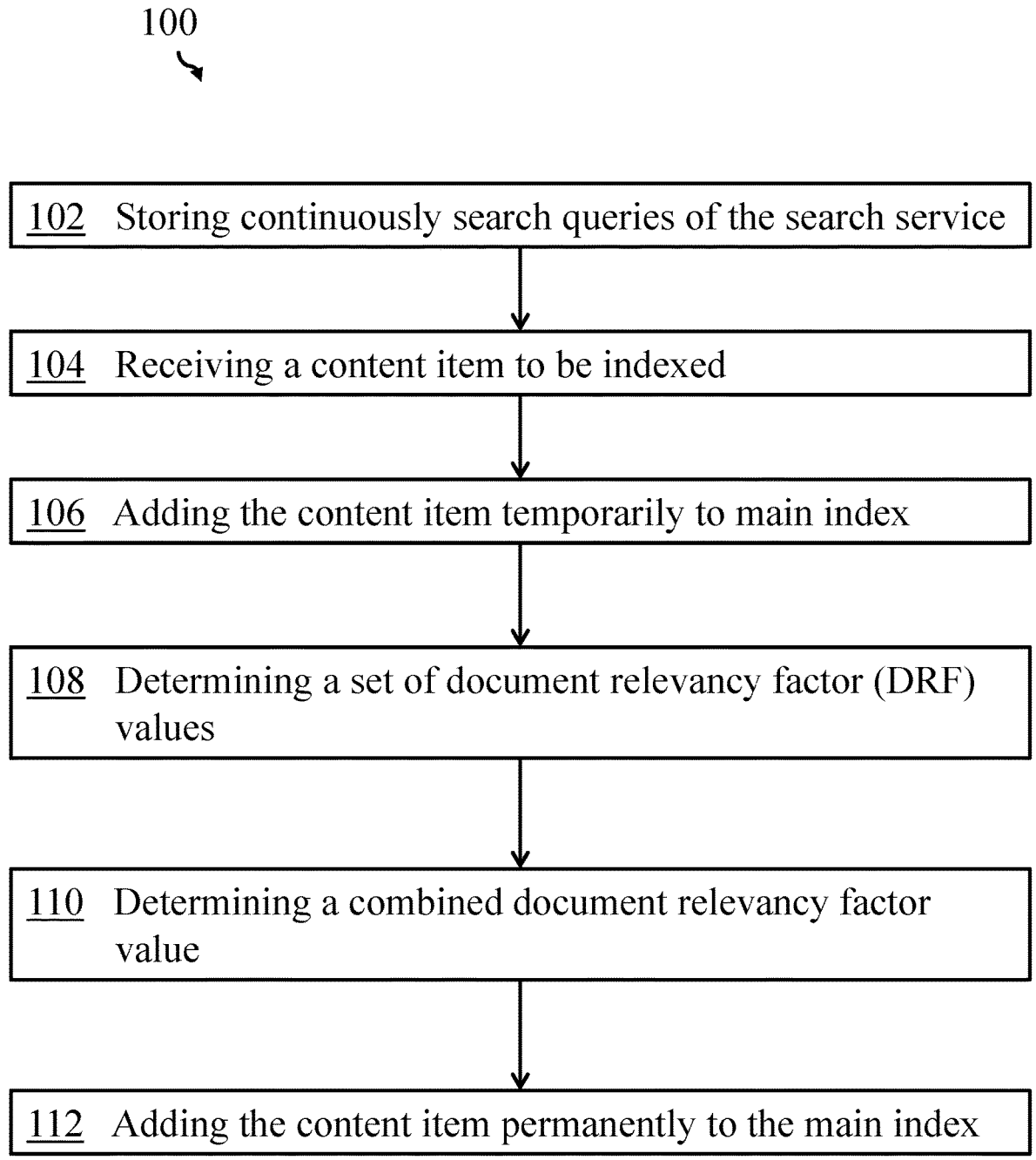
FIG. 1 shows a block diagram of some embodiments of a computer-implemented method for optimizing a search index of a search service, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

In the context of this description, the following conventions, terms and/or expressions may be used:

The term "index" or "search index" may denote a repository maintaining terms identified during an indexing process of a search corpus, as well as a pointer to the original document in the corpus of documents or content items. Search indexes may be maintained (e.g., in the main memory of a computer system) in order to decrease the response time for individual search requests.

The term "search service" may denote a computer supported service (sometimes implemented using a microservices architecture) for identifying content items in a collection of content items. The content items may be text documents (in any format) images, audio files, video files, or other types of items as appropriate to the search corpus. Often the documents may be denoted as content items. Also, often the documents may be managed and organized by a content management system.

The term "search engine" may denote a component of a search service. The search engine may be enabled to identify documents comprising a received search term. The search engine may use indexes for identifying documents rapidly. Rules may be used to control the functioning of the search engine.

The term "main index" may denote a data collection used by a search service or search engine in order to identify documents that may be relevant for a specific search query. It may be noted that in traditional search engines one index (i.e., the main index) is used. Often one index may be used for one tenant, i.e., for a group of users or using services belonging together.

The term "secondary index" may also denote a data collection used by a search service or search engine in order to identify documents that may be relevant for a specific search query. However, the secondary index may comprise data, terms, and expressions of which do not relate to the most popular queries in a specific search environment, or have otherwise been deemed to have a secondary status compared to data, terms, and expressions present in the main index.

The term "content item" may denote a document which should be identifiable and retrievable using a search service or a search engine. In order to execute the identification or retrieval, it may be useful to manage a content index (main index, secondary index, and/or additional indexes) in order to quickly identify a search term of a query together with a link to a storage location (e.g., URL (universal resource locator)) of the related document, i.e., content item. The content item may be a document, an image, an audio file, a spreadsheet, a map or similar, combinations thereof, or other types of files.

The term "term document relevancy factor (DRF) value" may denote a numerical value (a real number) indicative of a relevance of a document, i.e., a content item, in light of a defined plurality of stored queries. Thus, the same content item may have different document relevancy factor values in different search environments.

The term "term frequency-inverse document frequency" (tf-idf) may denote a numerical statistic that is intended to reflect how important a word may be to a content item in a collection or corpus. It may be often used as a weighing factor in searches of information retrieval, text mining, and user modeling. The tf-idf value may be increased in proportion to the number of times a word appears in the content item and is offset by the number of documents in the corpus that contain the word. This helps to adjust for the fact that some words appear more frequently in general.

The embodiments of the present disclosure provide for optimizing a search index of a search service and may offer multiple advantages and technical effects relative to existing technologies. These improvements and/or advantages are a non-exhaustive list of example advantages. Embodiments of the present disclosure exist which can contain none, some, or all of the following advantages and/or improvements.

The disadvantages of managing large amounts of documents of a tenant in one single search collection, i.e., in one single index, can be overcome. The same applies if a single index is used for a single user. Because the index grows over time as more content is added, the overall updating performance can degrade if the same amount of computing resources is available. Secondly, the quality of the search result list ranking may degrade as the number of less relevant documents and noise grows. The results can be even worse with multi-tenant search environments relating multiple tenants to the same index.

Hence, a smaller search collection, i.e., a smaller index, with only the most relevant documents may provide faster search results and better search results rankings and therefore better search results to the user. This may allow a search engine to optimize query processing. First, the search engine may run a query against the main index only. Only if the number of results is below a defined threshold value or fails to match certain defined constraints, the search engine may then run the query against the additional (for example secondary) index, or further indexes.

Excellent results may also be achieved by using a main index and a secondary index. As such, it may not be required to have a larger number of secondary search indexes. By calculating the document relevancy factor value based on the stored search queries, it becomes possible to extend experience—in form of the stored search queries—to the future. Those queries for those terms and expressions used the most—according to another selection algorithm—can generate results by the search engine in a short amount of time. Thus, the user may experience a higher performance of the search service.

It may also be possible to select different storage locations for the main and secondary index. The main index may be located in the fastest memory available in the computing system (e.g., main memory or cache) supporting the search service, and a secondary index may be stored in a somewhat slower storage system in a tiered storage system.

It is also possible to use boosting rules, which can move a search term, and thereby one or more qualifying documents, from the secondary index to the main index. Other rules (i.e., burying rules) may move a search term into the secondary index. Such rules can be used to promote content, for example prioritizing higher priced items in a shopping platform's search indexes or hide less desirable content. Both may be done actively by a search engine administrator, or automatically by following specified rules.

It is also possible for the search engine administrator to define a document relevancy window. This document relevancy window may define the number of such terms to be used for the calculation of the document relevancy factor. If the document relevancy factor may be, e.g., 49, only those 49 search queries are used to determine the document relevancy factor that are ranked highest, i.e. having the highest frequency.

There may also be advantages if the search engine makes heavy use of configurable caches. In the case when a search collection is split into a main and secondary index it would be possible to optimize access through caches for the main index and not use or lessen cache size for the secondary index. This would result in less memory consumption due to optimized caching as well as faster response times when the main index only is involved.

In the following, a detailed description of the figures will be given. All instructions in the figures are schematic. Firstly, a block diagram of an embodiment of a computer-implemented method for optimizing a search index of a search service is given. Afterwards, further embodiments, as well as embodiments of the search system for optimizing a search index of a search service, will be described.

FIG. 1 shows a block diagram of some embodiments of a computer-implemented method 100 for optimizing a search index of a search service, in accordance with embodiments of the present disclosure. The search service comprises a search engine, a main index, and a secondary index. The method 100 comprises storing continuously search queries of the search service at 102. This can occur in various ways in embodiments and can include monitoring search query inputs received by the search service and storing the search queries in a database, table, or other format as appropriate for the search service. The storing at 102 can be in various types of storage media including, but not limited to, hard disk drives, solid state drives, network storage drives, memory, tape storage, or any other suitable form of storage.

Method 100 also comprises receiving a content item to be indexed at 104. Receiving a content item to be indexed can occur when a new document is received or identified by the search service. Method 100 further comprises adding the content item temporarily to the main index at 106.

According to some embodiments of the present disclosure, adding a new content item temporarily to the main index may also comprise building a separate temporary index against which the document relevancy factor (DRF) value for the content item is determined. There may be three or more options for such a step. The content item may provisionally be added to the main index and the DRF value may be determined using such a provisional main search index, or the main index can be copied with all rules and settings and the content item is added to this temporary second main index and the DRF value is determined. This second alternative may have the advantage that the unchanged main index may be used in parallel by other search queries in its original form. In a third alternative, the content item to be indexed may be flagged when temporarily added to the main index. However, all regular index terms may then have also a flag indicative of a regular index term.

Furthermore, the method 100 comprises determining at 108, a set of document relevancy factor (DRF) values for the content item for a selected set of stored search queries. According to some embodiments of the present disclosure, the determination of the DRF value may comprise determining a term frequency-inverse document frequency (tf-idf) value. It may help to add weighting factors to certain search terms, such that the weight of a term that occurs in a document may simply be proportional to the term frequency.

According to some embodiments of the present disclosure, the determination of the DRF value may comprise a determining of performance indicator values influenced by a response-time value of a query, an error rate value, or memory and/or processor consumption value, i.e., the less resources are used for the DRF determination the higher the DRF value becomes. Thus, a good performance of the search service may be achievable with fewer resources. Alternatively, the performance, i.e., response time, of the search service may increase using the same amount of computing resources.

According to some embodiments of the present disclosure, the document relevancy factor may be determined by the formula:

$$DRF = a*(tf\text{-}idf) + b*R + c*E + d*M + e*P, \text{ wherein}$$

tf-idf=frequency-inverse document frequency,
R=a response-time value,
E=error rate value,
M=an amount of memory used,
P=a processing power value, and
each of a, b, c, d, and e are real numbers.

This may be one way to determine the DRF using weighting factors a, b, c, d, and e. However, also these weighting factors may depend on variables, like, e.g., time during the day, day of the week, and/or other time relevant dependencies. Also, other influencing factors, like geographical coordinates (regions), time zone information, theme specific search services, language, author, etc., may be used.

According to some embodiments of the present disclosure, determining document relevancy factor values for the content items may comprise applying a search rule to query results before determining a ranking result. Such a search rule may, e.g., be a boost or bury rule. At least one of such rules may be applied. A boost rule may artificially increase the relevancy of a research result, whereas a bury rule may decrease a certain search result's document relevancy factor value. Weighting factors of the rule may vary from search term to search term and from search result to search result. Also, mutual dependencies between search results, as well as search query terms and a search result order may influence the result of an application of the rule.

According to some embodiments of the present disclosure, the selected set of stored search queries may comprise a predefined number of most often used search queries. These may represent the most popular search queries. If a good performance, i.e., response time can be achieved, it can be expected that the overall performance of the search service increases.

Method 100 further comprises determining at 110, a combined document relevancy factor value out of the determined set of document relevancy factor values for the content item—e.g., an average value. Method 100 can conclude by adding, at 112, the content item permanently to the main index if the combined ranking value is larger than a document relevancy factor threshold value. According to some embodiments of the present disclosure, adding the content item permanently to the main index may also comprise configuring the temporary indexed content item in the main index as now permanent if the DRF value is larger than the DRF threshold value. This may finalize the indexing process for the new content item.

According to some embodiments, the method may also comprise adding the content item to a secondary index if the document relevancy factor value is below or equal to the document relevancy factor threshold value. In case a secondary index does not exist, it may be created with the first content item to be added to the secondary index. The secondary index may free the main index from containing less relevant search index terms.

Additionally, the proposed concept can be used in a serial fashion to include one new content item after the other in a streaming process to the corpus and the index(es), and/or in a parallel fashion to process multiple content items at the same time. It is also possible to not build an average value but a weighted average reflecting the ranking of the frequency of the stored queries.

Figure 2:
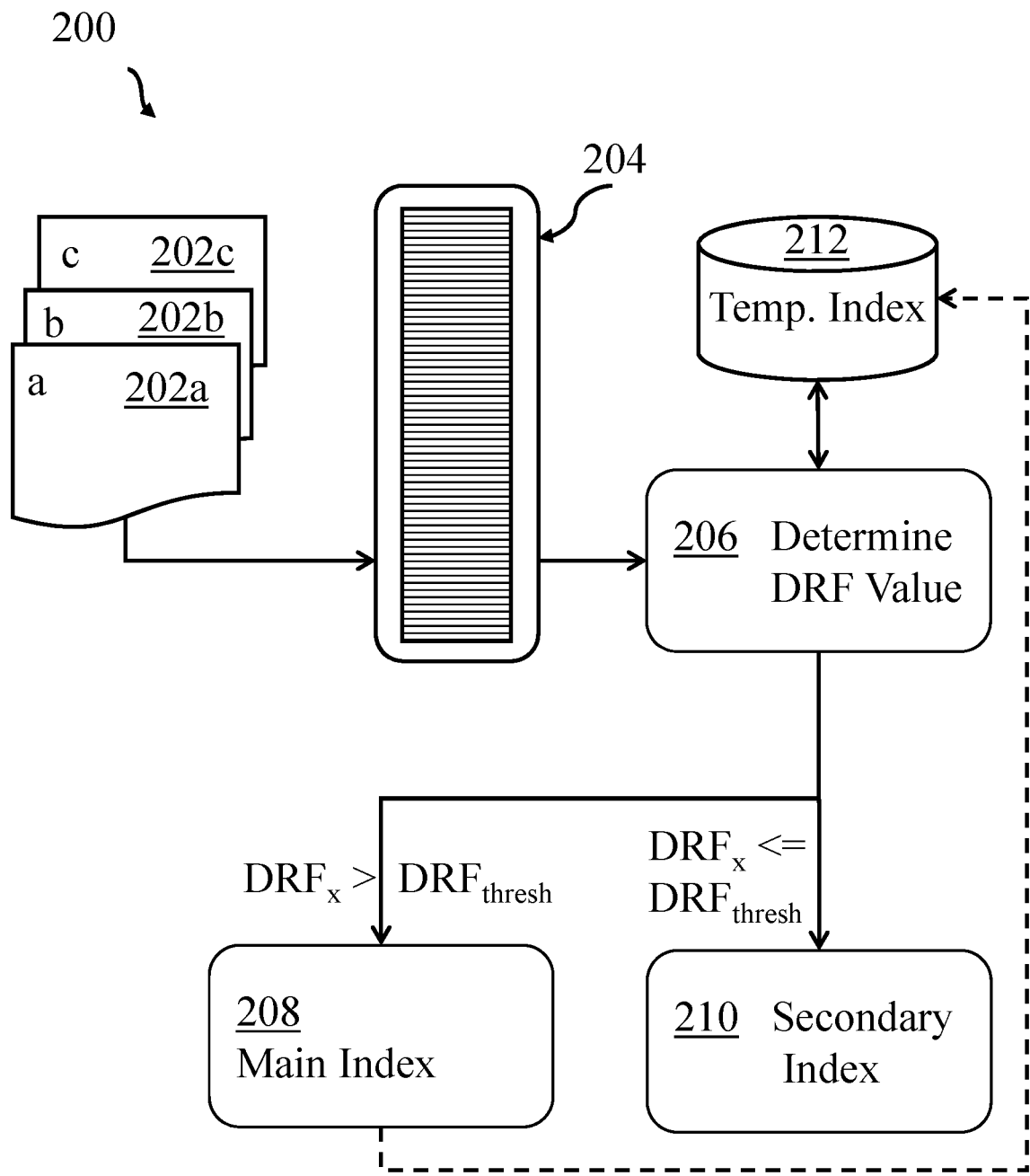
FIG. 2 shows a block diagram of building blocks of an embodiment of the present disclosure.

FIG. 2 shows a block diagram 200 of building blocks of an embodiment of the present disclosure. Incoming content items (which can be e.g., documents) A, B, and C (202a, 202b, and 202c or collectively 202) to be indexed are tested against a selected number of stored queries 204 (e.g., most often used, most recent, or otherwise prioritized). Content items 202 can be such as those received at 104 of method 100 described above with regards to FIG. 1. Based on this testing, a DRF value for a specific content item is determined, as shown in block 206, which can be performed using a temporary index (212). As a result of this step, the terms relevant for each received content item 202 are added to the main index 208 if the DRF is larger than the DRF threshold value or, added to the secondary index 210 if the DRF value is smaller or equal to the DRF threshold value. This is illustrated in the figure where $DRF_x$ is the DRF for any given content item x (which may be any of the content items 202) and $DRF_{thresh}$ is the DRF threshold value. It may also be noted that the concept of the temporary (main) index 212 may be used. Thus, for the next content item 202 to be indexed an already upgraded main index may be used for the determination of the DRF for the next content item 202 (document b after document a), and so on.

Figure 3:
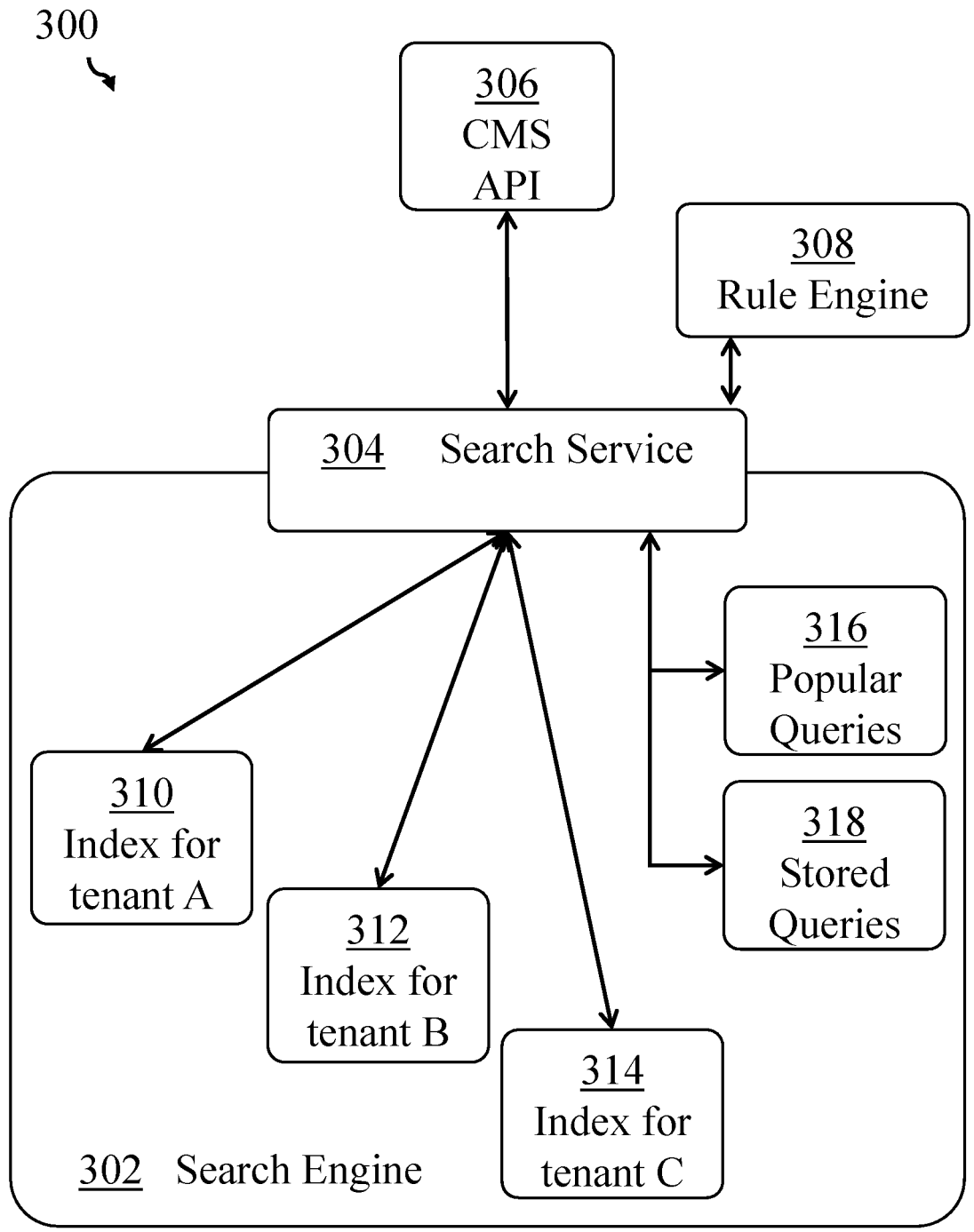
FIG. 3 shows a block diagram of an embodiment of a search environment, in accordance with some embodiments of the present disclosure.

FIG. 3 shows a block diagram 300 of an embodiment of a search environment, in accordance with some embodiments of the present disclosure. The search environment may comprise a search service 304, a search engine 302 and a client application, e.g., a content management system (CMS) application programming interface (API) 306. The CMS API 306 interacts with the search service 304, where the search service 304 acts as an interface between the search engine 302 and the CMS API 306. The behavior of the search service 304 and/or search engine 302 is influenced by a rule engine 308 in which certain configuration parameters for searching and ranking can be determined and/or stored.

Typically, each tenant (including the example tenants A, B, and C) has a dedicated index (shown here as index for tenant A 310, index for tenant B 312, and index for tenant C 314). A tenant should be understood as a plurality of users. More or fewer tenants can be present in various embodiments and the example shown of three tenants is not to be read as limiting. The search service 304 can access the repository of popular queries 316 and/or the repository of stored queries 318. In some embodiments, the repository of popular queries 316 and the repository of stores queries 318 can be partitioned by tenant, can also be stored separately per tenant, or can be shared between the tenants.

Figure 4:
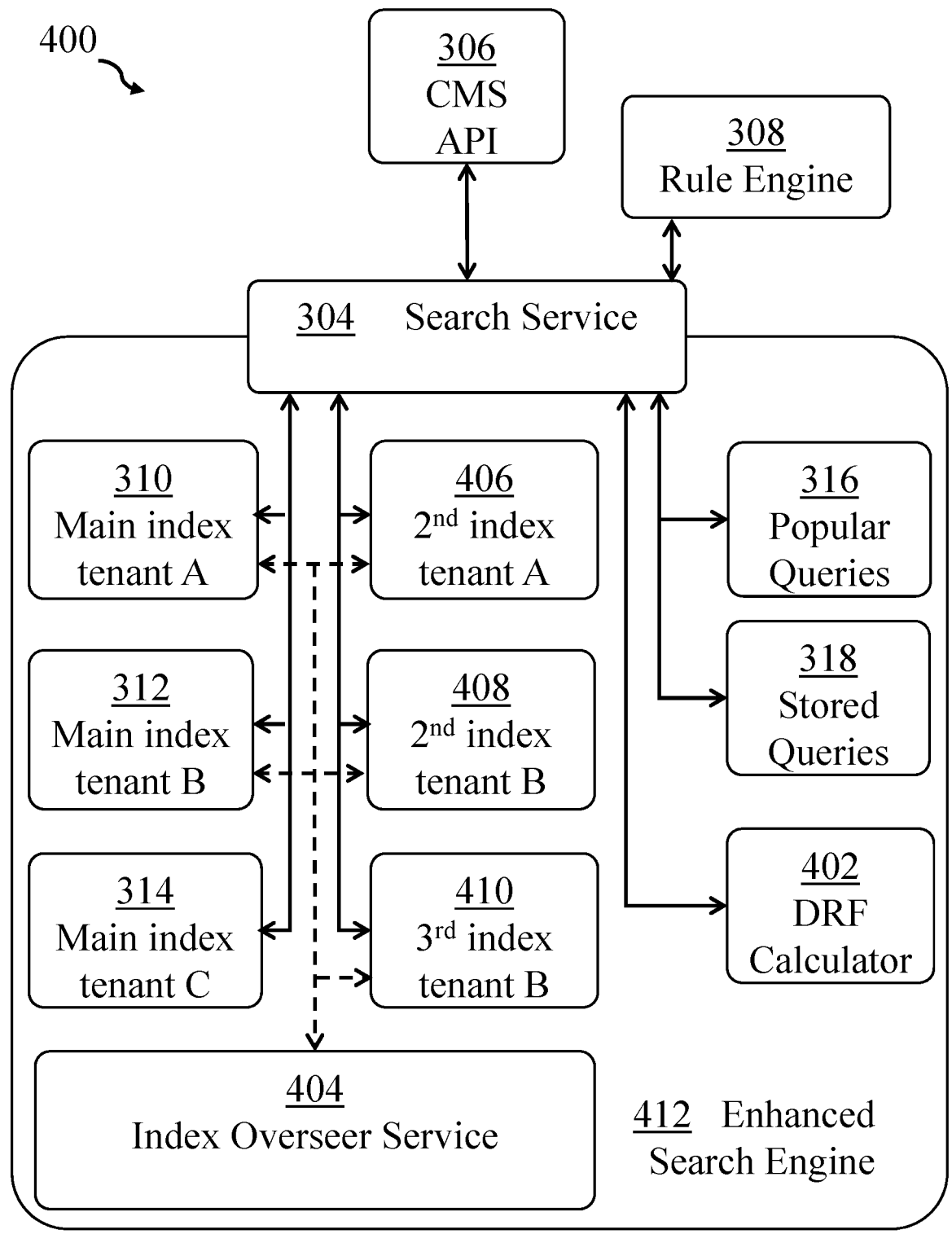
FIG. 4 shows a block diagram of an embodiment of an enhanced search engine, in accordance with some embodiments of the present disclosure.

FIG. 4 shows a block diagram 400 of an embodiment of an enhanced search engine 412, in accordance with some embodiments of the present disclosure. Some building blocks are the same as in FIG. 3 and the same reference numerals are used to indicate they have the same purpose and functionality. In FIG. 3, there was one index per tenant (310, 312, and 314), and those same indexes appear in FIG. 4 as the main index per tenant (310, 312, and 314) with the addition of additional indexes. The additional building blocks can be summarized as: a second index for tenant A (406), and a second and a third index (408 and 410) for tenant B, a document relevancy factor (DRF) value calculator 402, and an index overseer service 404. The DRF calculator 402 interacts with the search service 304; and the index overseer service 404 interacts with the different indexes 310, 312, 314, 406, 408, and 410 to ensure that index terms of content items (not shown) are searchable by the enhanced search engine 412 using the concept of multiple indexes per tenant. It may be noted that for tenant C 314 a secondary index is not shown. This is possible in the same way as it is possible to have two or more secondary indexes for the same tenant (compare 408 and 410). This may occur for various reasons, including for example, if there are insufficient items in the main index for tenant C, such that a second index is unnecessary and/or has not yet been created.

According to some embodiments of the present disclosure, the main and the secondary index may be used only for a single tenant or only a single user of the search service. Hence, independently of the user scope of an index (i.e., main and/or secondary index) the proposed method and system may be used advantageously.

FIG. 5 shows a flowchart 500 of steps during the indexing phase, in accordance with embodiments of the present disclosure. The search service receives, at 502, a request for indexing a new content item, which can be substantially similar to operation 104 of method 100. Then, the search service sends, 504, the content item to the document relevancy calculator. The document relevancy factor (DRF) calculator (which can be DRF calculator 402 of FIG. 4) determines, at 506, one or more document relevancy factor values. A set of DRF values can be used in some embodiments and discussed above in more detail. In step 508, the DRF calculator returns the one or more DRF values to the search service, which can be in the form of an average or weighted average value. Further examples and discussion of DRF calculator usage appear in the following figures and discussion. After that the search service determines, 510, the appropriate index for the content item—i.e., the main index, the secondary index or further indexes—based on the DRF value(s). The search service places, at 512, the content item in the previously determined index for that specific tenant the new document item relates to.

Figure 6:
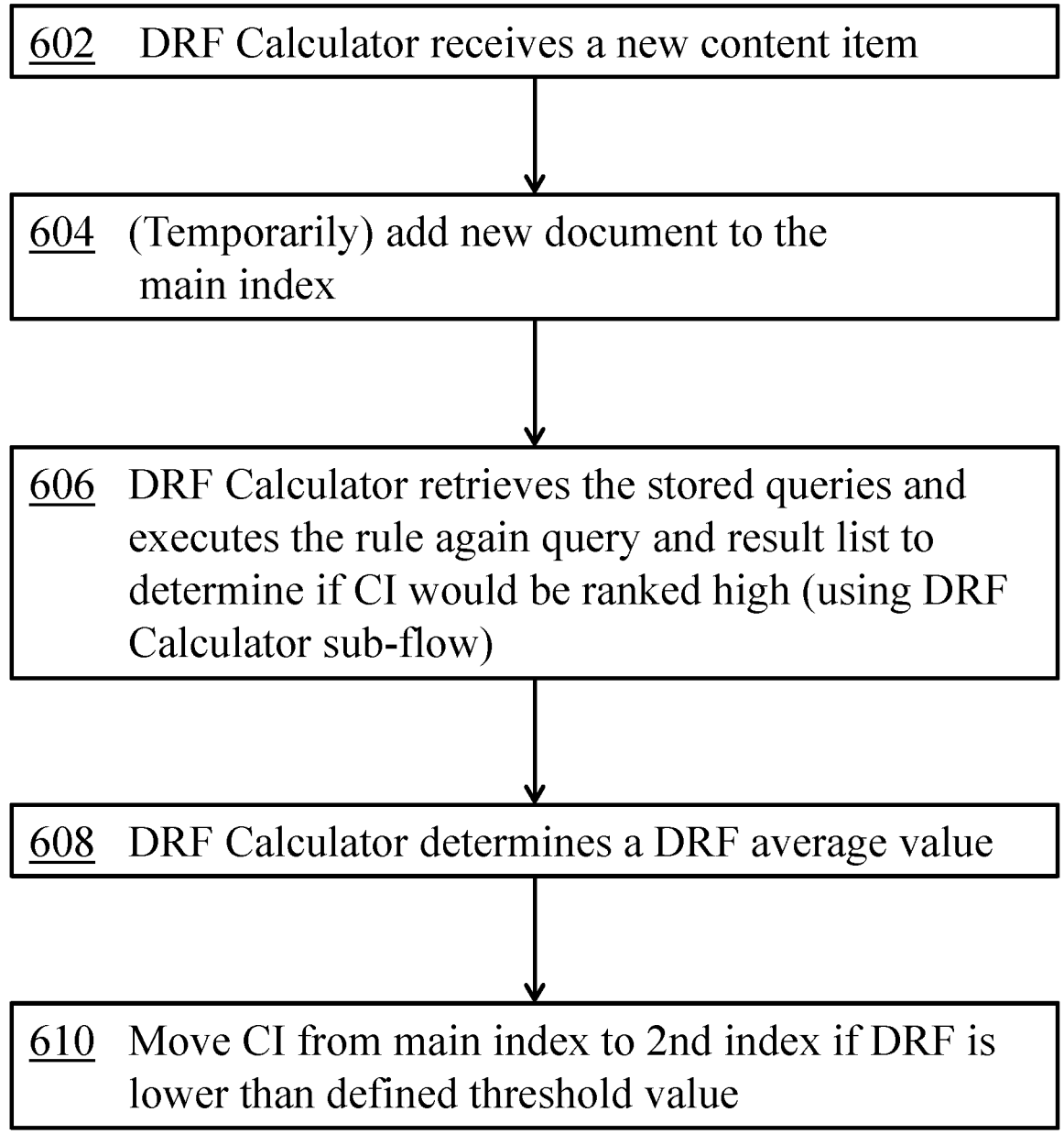
FIG. 6 shows a flowchart for a calculation of a document relevancy factor value, in accordance with embodiments of the present disclosure.

FIG. 6 shows a flowchart 600 for a calculation of a document relevancy factor, in accordance with embodiments of the present disclosure. First, the document relevancy factor (DRF) calculator receives, at 602, a new content item. This can occur as a result of operation 504 of FIG. 5, discussed above. This content item is added, at 604, (temporarily) to the main index. Then, 606, the DRF Calculator retrieves the stored queries and executes the one or more queries and result lists to determine if the content item (CI) would be ranked high if such a stored query were run with the CI in the main index (described below with regard to the DRF Calculator sub-flow, FIG. 7). At 608, the DRF determines an average DRF value based on the related different executed queries. If the average DRF value is lower than the defined threshold value, the content item—in particular the terms to be searchable—will be moved, at 610, from the main index to the secondary index.

FIG. 7 shows a flowchart 700 DRF Calculator sub-flow, in accordance with embodiments of the present disclosure.

Flowchart 700 provides additional detail regarding operation 606 of FIG. 6, above. As a first operation, at 702, a query is loaded and executed against the main index (which temporarily includes the CI). Then, boost and bury functions can be executed, at 704, against the result list. As discussed above, these can be employed in embodiments to add weight or subtract weight to content items or terms to boost their rankings in a search or bury them lower in a search. Next, a position for the content item is determined, 706, in a so-called document relevancy window. The size of the document relevancy window may be predetermined, e.g., 100, meaning that the 100 highest ranked content items lie in the document relevancy window.

Next, the determined DRF value is assigned, 708, to the content item for a current query. At 710, boosted and highly ranked content items get a comparably high DRF value.

Figure 8:
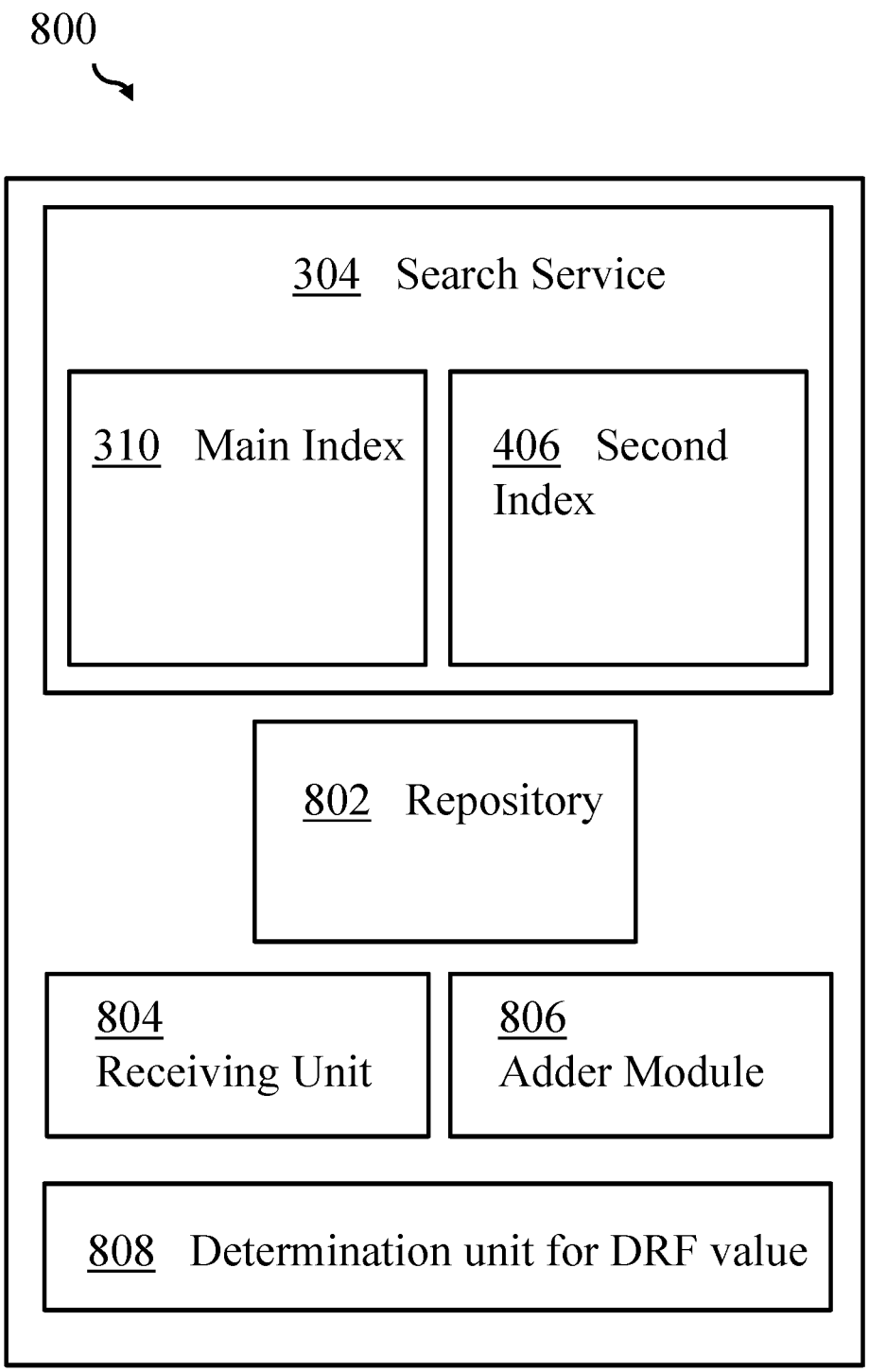
FIG. 8 shows a block diagram of an enhanced search system, in accordance with embodiments of the present disclosure.

FIG. 8 shows a block diagram of an enhanced search system 800 for optimizing a search index of a search service, in accordance with embodiments of the present disclosure. Some components of enhanced search system 800 are depicted using the same reference numerals as previous figures where the elements of the enhanced search system are the same as previously described. The search service 304 comprises a search engine and a main index 310, as well as a secondary index 406 (compare FIG. 3, FIG. 4). The enhanced search system 800 also comprises a repository 802 adapted for continuously storing search queries of the search service, a receiving unit 804 adapted for receiving a content item to be indexed, and an adder module 806 adapted for adding the content item temporarily to the main index 310. Additionally, the adder module 806 is also adapted for adding the content item permanently to the main index if the combined ranking value is larger than a document relevancy factor threshold value.

The system also comprises a determination unit 808 (comparable to DRF calculator 402, FIG. 4) adapted for determining a set of document relevancy factor (DRF) values for the content item for a selected set of stored search queries, wherein the determination unit is also adapted for determining a combined document relevancy factor value out of the determined set of document relevancy factor values for the content item.

Figure 9:
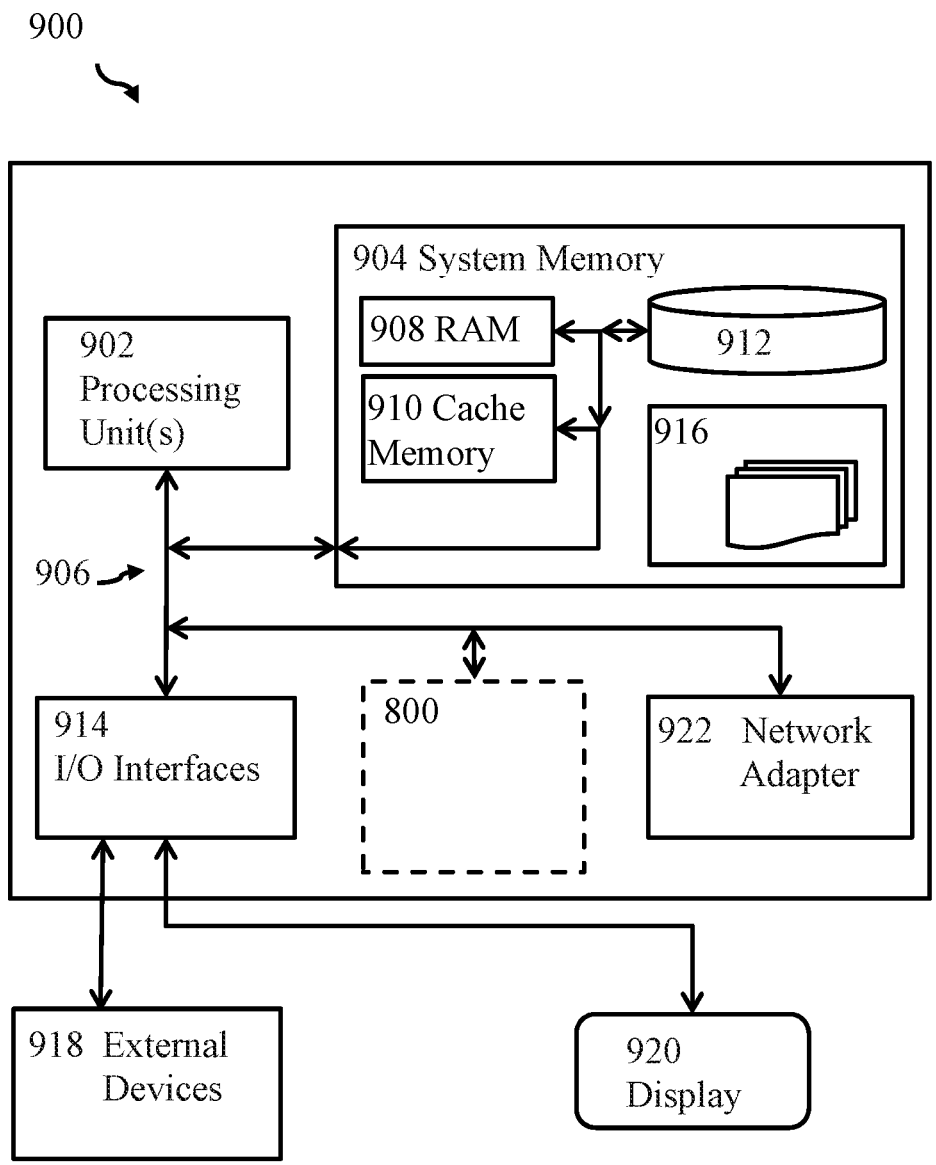
FIG. 9 shows an embodiment of a computing system, in accordance with embodiments of the present disclosure.

Embodiments of the invention may be implemented together with virtually any type of computer, regardless of the platform being suitable for storing and/or executing program code. FIG. 9 shows, as an example, a computing system 900 suitable for executing program code related to the proposed method.

The computing system 900 is only one example of a suitable computer system, and is not intended to suggest any limitation as to the scope of use or functionality of embodiments of the disclosure described herein. In the computer system 900, there are components, which are operational with numerous other general purpose or special purpose computing system environments or configurations. Examples of well-known computing systems, environments, and/or configurations that may be suitable for use with computer system 900 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system 900 may be described in the general context of computer system-executable instructions, such as program modules, being executed by a computer system 900. Generally, program modules may include routines, programs, objects, components, logic, data structures, and so on that perform particular tasks or implement particular abstract data types. Computer system 900 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system 900 is shown in the form of a general-purpose computing device. The components of computer system 900 may include, but are not limited to, one or more processors or processing units 902, a system memory 904, and a bus 906 that couples various system components including system memory 904 to the processor 902. Bus 906 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system 900 typically includes a variety of computer system readable media. Such media may be any available media that is accessible by computer system 900, and includes both volatile and non-volatile media and removable and non-removable media.

The system memory 904 may include computer readable media in the form of volatile memory, such as random access memory (RAM) 908 and/or cache memory 910. Computer system 900 may further include other removable/non-removable, volatile/non-volatile computer storage media. By way of example only, a storage system 912 may be provided for reading from and writing to a non-removable, non-volatile magnetic media (not shown and typically called a "hard drive"). Although not shown, a magnetic disk drive for reading from and writing to a removable, non-volatile magnetic disk (e.g., a floppy disk), and/or an optical disk drive for reading from or writing to a removable, non-volatile optical disk such as a CD-ROM, DVD-ROM or other optical media may be provided. In such instances, each can be connected to bus 906 by one or more data media interfaces. System memory 904 may include at least one program product having a set (e.g., at least one) of program modules 916 that are configured to carry out the functions of embodiments of the present disclosure.

The program/utility, having a set (at least one) of program modules 916, may be stored in memory 904 by way of example, and not limiting, as well as an operating system, one or more application programs, other program modules, and program data. Each of the operating systems, one or more application programs, other program modules, and program data or some combination thereof, may include an implementation of a networking environment. Program modules 916 generally carry out the functions and/or methodologies of embodiments of the present disclosure, as described herein.

The computer system 900 may also communicate with one or more external devices 918 such as a keyboard, a pointing device, a display 920, etc.; one or more devices that enable a user to interact with computer system 900; and/or any devices (e.g., network card, modem, etc.) that enable computer system 900 to communicate with one or more other computing devices. Such communication can occur via Input/Output (I/O) interfaces 914. Still yet, computer system 900 may communicate with one or more networks such as a local area network (LAN), a general wide area network (WAN), and/or a public network (e.g., the Internet) via network adapter 922. As depicted, network adapter 922 may communicate with the other components of computer system 900 via bus 906. It should be understood that, although not shown, other hardware and/or software components could be used in conjunction with computer system 900. Examples include, but are not limited to: microcode, device drivers, redundant processing units, external disk drive arrays, RAID systems, tape drives, and data archival storage systems, etc.

Additionally, the search system 800 of FIG. 8 for optimizing a search index of a search service may be attached to the bus system 906.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to limit the invention. As used herein, the singular forms "a," "an," and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for improving a search service, the method comprising:
    storing, continuously, search queries of the search service, wherein the search query includes one or more search terms;
    receiving a content item to be indexed, wherein the content item is a file identifiable and retrievable using the search service through the one or more search terms of the one or more stored search queries;
    determining an index from a plurality of indexes of the search service to temporarily add the one or more search terms associated with the content item;
    adding, in response to the temporary index determination, the one or more search terms temporarily to the determined index from the plurality of indexes comprising one of:
        provisionally adding the one or more search terms to a first index of the plurality of indexes, wherein the one or more search terms therein are provisional data; and
        creating a temporary index of the plurality of indexes, wherein the one or more search terms therein are temporary data;
    comparing a document relevancy factor (DRF) value for the one or more search terms to a DRF threshold value;
    determining, in response to the comparison, an index from the plurality of indexes to permanently receive the one or more search terms as a function of the comparison; and
    adding, in response to the determining the index from the plurality of indexes to permanently receive the one or more search terms, the one or more search terms to the determined index to receive the one or more search terms, comprising:
        moving, permanently, the provisional data from the first index and the temporary data from the temporary index to one of the first index and a second index of the plurality of indexes.

2. The method of claim 1, wherein the selected set of stored search queries comprises a predefined number of most often used search queries.

3. The method of claim 1, further comprising:
    determining a set of DRF values for the one or more search terms for a selected set of stored search queries;
    determining a combined DRF value out of the determined set of DRF values for the one or more search terms, wherein the determining a set of DRF values for the one or more search terms further comprises:
        applying a search rule to query results before determining a ranking result, wherein the search rules comprise one or more of:
            a boost rule configured to increase the relevancy of a search result; and
            a bury rule configured to decrease the relevancy of a search result.

4. The method of claim 3, wherein the adding the one or more search terms to the determined index comprises adding the one or more search terms to the first index if the combined DRF value for the one or more search terms is larger than the DRF threshold value, wherein the first index is a main index.

5. The method of claim 4, wherein the adding the one or more search terms to the determined index comprises adding the one or more search terms to the second index if the combined DRF value for the one or more search terms is below or equal to the DRF threshold value.

6. The method of claim 1, wherein the creating a temporary index of the plurality of indexes, wherein the one or more search terms therein are temporary data comprises:
    building a separate temporary index for determining the set of DRF values for the one or more search terms.

7. The method of claim 3, where the determination of the set of DRF values comprises determining a term frequency-inverse document frequency value.

8. The method of claim 7, where the determination of the set of DRF values further comprises:
    determining one or more performance indicator values selected from the group of a response-time value of a query, memory consumption value, and a processor consumption value.

9. The method of claim 5, wherein the main index and the second index are used for a single tenant of a single user of the search service.

10. A search system for improving a search service, the system comprising:
    one or more processors; and
    a memory communicatively coupled to the one or more processors,
    wherein the memory comprises instructions which, when executed by the one or more processors, cause the one or more processors to perform a method comprising:
        storing, continuously, search queries of the search service, wherein the search query includes one or more search terms;
        receiving a content item to be indexed, wherein the content item is a file identifiable and retrievable using the search service through the one or more search terms of the one or more stored search queries;
determining an index from a plurality of indexes of the search service to temporarily add the one or more search terms associated with the content item;
adding, in response to the temporary index determination, the one or more search terms temporarily to the determined index from the plurality of indexes comprising one of:
provisionally adding the one or more search terms to a first index of the plurality of indexes, wherein the one or more search terms therein are provisional data; and
creating a temporary index of the plurality of indexes, wherein the one or more search terms therein are temporary data;
comparing a combined document relevancy factor (DRF) value for the content item one or more search terms to a document relevancy factor DRF threshold value;
determining, in response to the comparison, an index from the plurality of indexes to permanently receive the one or more search terms as a function of the comparison; and adding, in response to the determining the index from the plurality of indexes to permanently receive the content item, the content item to the determined index to receive the one or more search terms, comprising: moving, permanently, the provisional data from the first index and the temporary data from the temporary index to one of the first index and a second index of the plurality of indexes.

11. The system of claim 10, wherein the selected set of stored search queries comprises a predefined number of most often used search queries.

12. The system of claim 10, further comprising:
determining a set of DRF values for the one or more search terms for a selected set of stored search queries;
determining a combined DRF value out of the determined set of DRF values for the one or more search terms, wherein the determining a set of DRF values for the one or more search terms further comprises:
applying a search rule to query results before determining a ranking result, wherein the search rules comprise one or more of:
a boost rule configured to increase the relevancy of a search result; and
a bury rule configured to decrease the relevancy of a search result.

13. The system of claim 12, wherein the adding the one or more search terms to the determined index comprises adding the one or more search terms to the first index if the combined DRF value for the one or more search terms is larger than the DRF threshold value, wherein the first index is a main index.

14. The system of claim 12, wherein the adding the one or more search terms to the determined index comprises adding the one or more search terms to the second index if the combined DRF value for the one or more search terms is below or equal to the DRF threshold value.

15. The system of claim 10, wherein the creating a temporary index of the plurality of indexes, wherein the one or more search terms therein are temporary data comprises:
building a separate temporary index for determining the set of DRF values for the one or more search terms.

16. The system of claim 12, where the determination of the set of DRF values comprises determining a term frequency-inverse document frequency value.

17. The system of claim 16, where the determination of the set of DRF values further comprises:
determining one or more performance indicator values selected from the group of a response-time value of a query, memory consumption value, and processor consumption value.

18. A computer program product for improving a search service, the computer program product comprising a computer readable storage medium having program instructions embodied therewith, wherein the computer readable storage medium is not a transitory signal per se, the program instructions being executable by one or more computing systems to perform a method comprising:
storing, continuously search queries of the search service, wherein the search query includes one or more search terms;
receiving a content item to be indexed, wherein the content item is a file identifiable and retrievable using the search service through the one or more search terms of the one or more stored search queries;
determining, an index from a plurality of indexes of the search service to temporarily add the one or more search terms associated with the content item;
adding, in response to the temporary index determination, the one or more search terms temporarily to the determined index from the plurality of indexes comprising one of:
provisionally adding the one or more search terms to a first index of the plurality of indexes, wherein the one or more search terms therein are provisional data; and
creating a temporary index of the plurality of indexes, wherein the one or more search terms therein are temporary data;
comparing a combined document relevancy factor (DRF) value for the one or more search terms to a document relevancy factor threshold value;
determining, in response to the comparison, an index from the plurality of indexes to permanently receive the one or more search terms as a function of the comparison; and
adding, in response to the determining the index from the plurality of indexes to permanently receive the one or more search terms, the one or more search terms to the determined index to receive the one or more search terms, comprising:
moving, permanently, the provisional data from the first index and the temporary data from the temporary index to one of the first index and a second index of the plurality of indexes.

19. The computer program product of claim of claim 18, further comprising:
determining a set of DRF values for the one or more search terms for a selected set of stored search queries;
determining a combined DRF value out of the determined set of DRF values for the one or more search terms, wherein the adding the one or more search terms to the determined index comprises adding the one or more search terms to the first index if the combined DRF value for the one or more search terms is larger than the DRF threshold value, wherein the first index is a main index.

20. The computer program product of claim 18, wherein the adding the one or more search terms to the determined index to the second index if the combined DRF value for the one or more search terms is below or equal to the DRF threshold value.

* * * * *